April 9, 1963 J. K. GOGIA ETAL 3,085,166

QUADRATURE REJECTION SYSTEM

Filed Sept. 2, 1958 3 Sheets-Sheet 1

Inventors
Jugal K. Gogia
John C. Guyeska
by Hill, Sherman, Meroni, Gross & Simpson Attys Inventors
Jugal K. Gogia
John C. Guyeska
by Hill, Sherman, Meroni, Gross & Simpson
Attys April 9, 1963 J. K. GOGIA ETAL 3,085,166

QUADRATURE REJECTION SYSTEM

Filed Sept. 2, 1958 3 Sheets-Sheet 3

Inventors
Jugal K. Gogia
John C. Guyeska
by Hill, Sherman, Meroni, Gross & Simpson
Attys 3,085,166
QUADRATURE REJECTION SYSTEM
Jugal K. Gogia and John C. Guyeska, Cleveland, Ohio, assignors to Thompson Ramo Wooldridge Inc., a corporation of Ohio
Filed Sept. 2, 1958, Ser. No. 758,250
1 Claim. (Cl. 307—105)

This invention relates to a quadrature rejection system and particularly to an electrical quadrature rejector unit for greatly attenuating a quadrature component of an input signal.

It is an important object of the present invention to provide a relatively simple and economical quadrature rejection system.

Another object of the invention is to provide a quadrature rejector unit of compact design for insertion in electrical servo systems and the like.

Still another object of the invention is to provide a quadrature rejector unit providing an extremely high quadrature rejection and high in-phase voltage gain without the use of moving parts.

A further object of the invention resides in the provision of a novel method and means for eliminating a quadrature component from an amplitude modulated signal.

The invention has particular application in servo systems wherever undesired quadrature voltage tends to cause saturation or excessive dissipation, or when quadrature voltage obscures desired in-phase servo error signals.

Other objects, features and advantages of the present invention will be apparent from the following detailed description taken in connection with the accompanying drawings, in which.

Figures 1, 2, 3, 3A, 8:
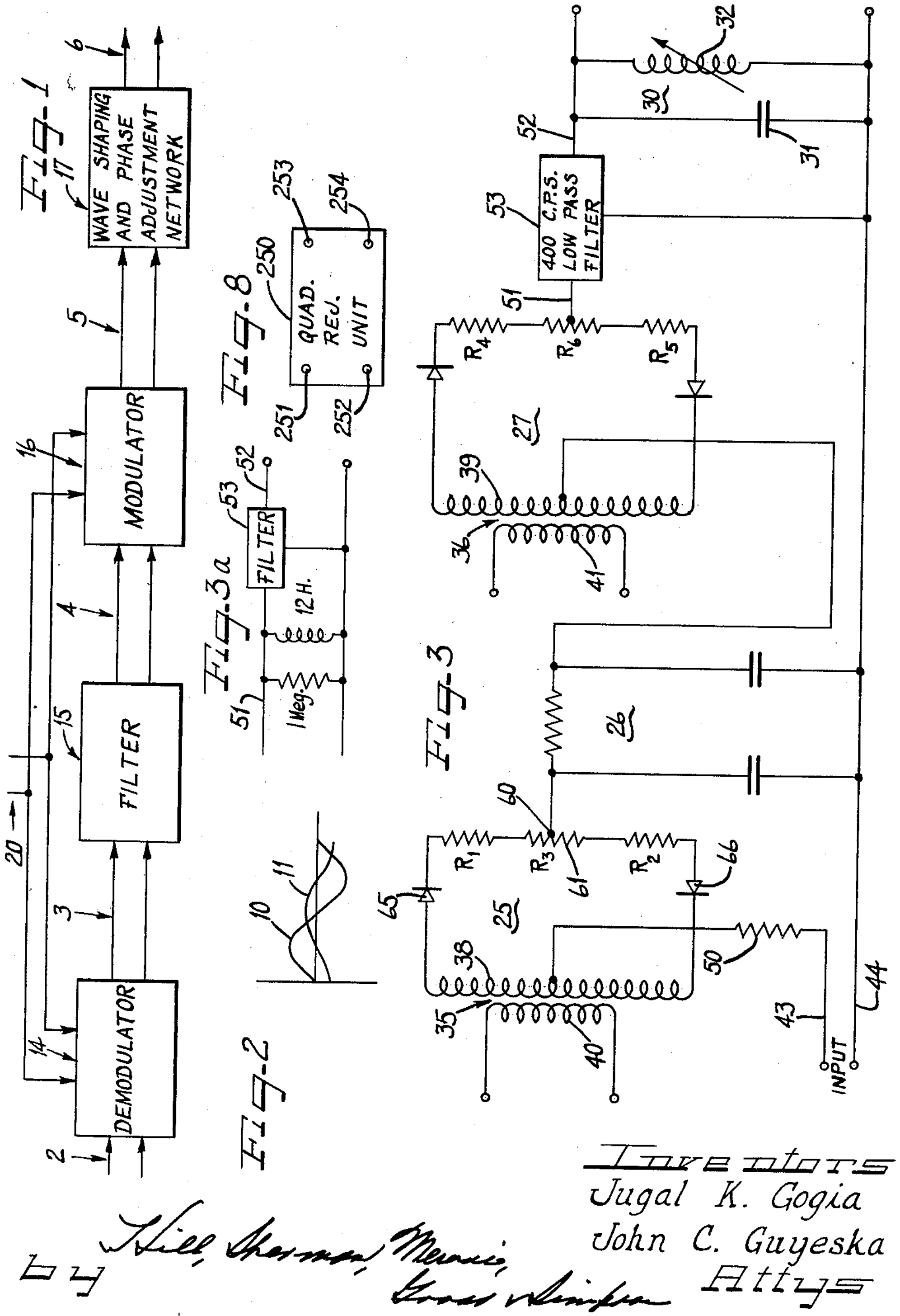
FIGURE 1 is a block diagram of a system in accordance with the present invention.
FIGURE 2 illustrates an exemplary input signal to the system including an in-phase and quadrature component.
FIGURE 3 illustrates a first electrical circuit in accordance with the system of FIGURE 1.
Figure 4:
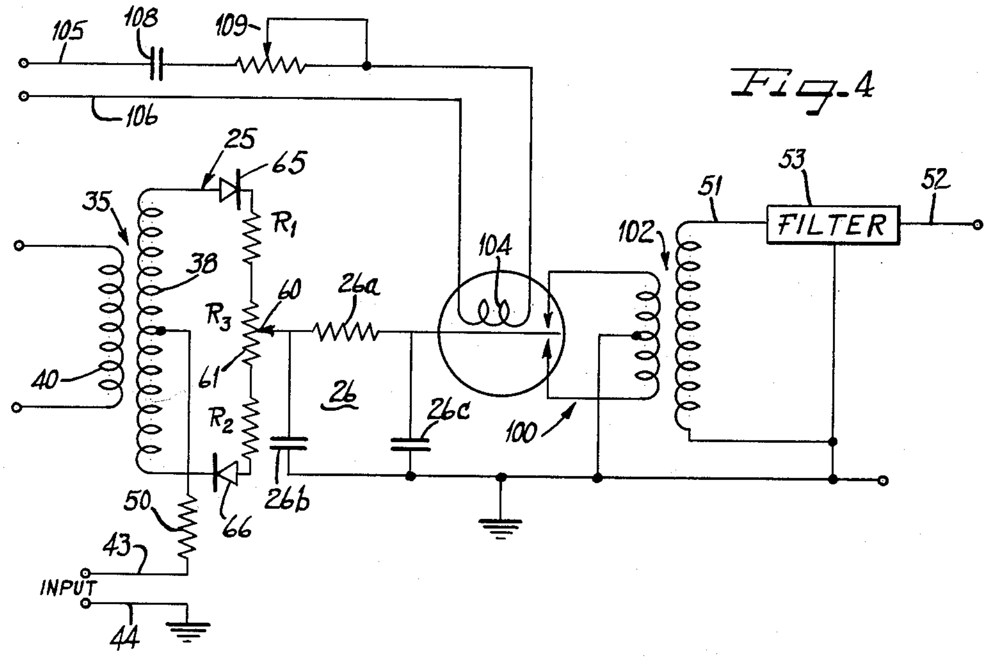
Figure 5:
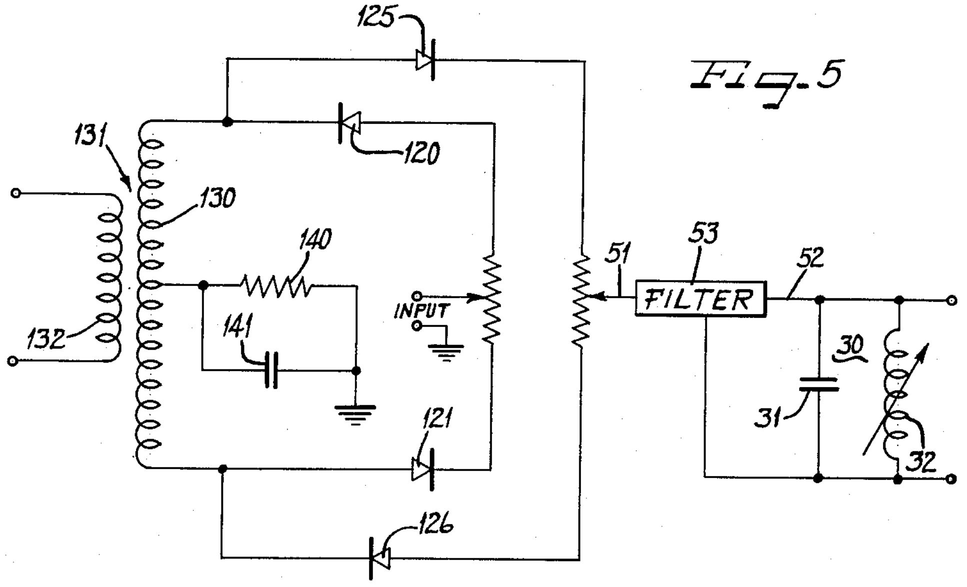
Figure 6:
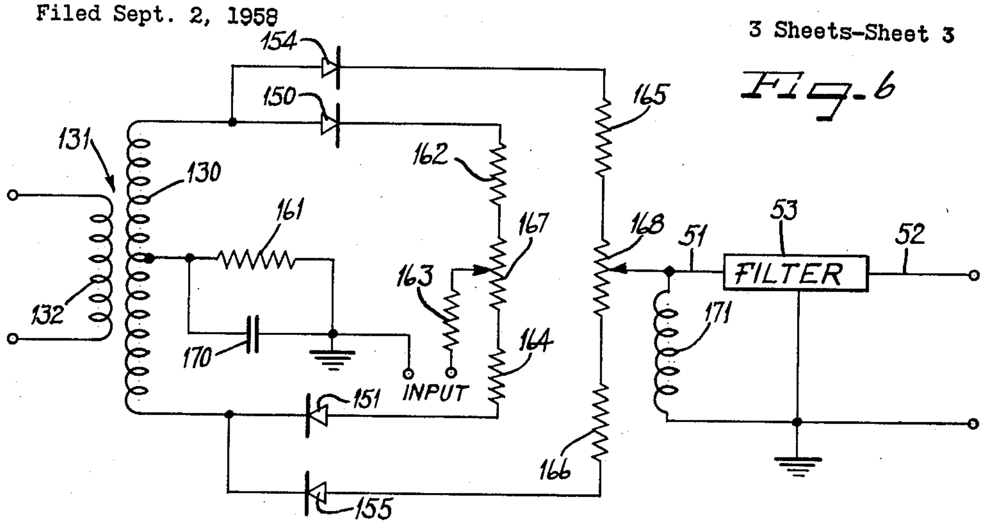
Figure 7:
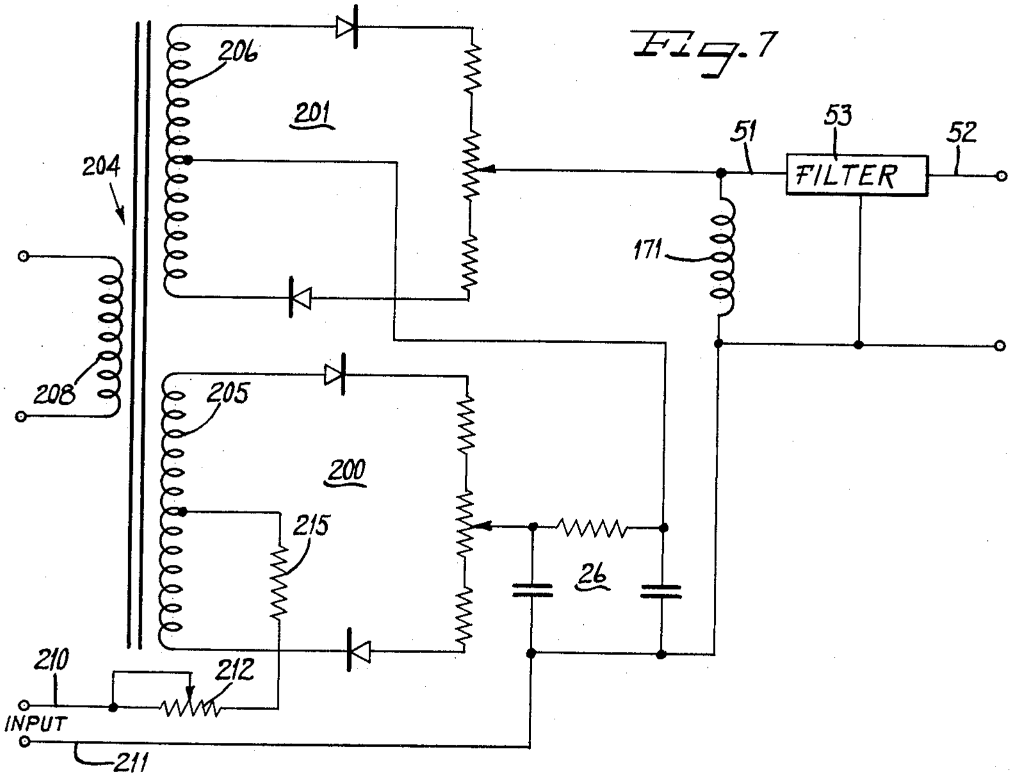

FIGURE 3*a* shows a modification of the circuit of FIGURE 3;

FIGURE 4 illustrates a second embodiment in accordance with the system of FIGURE 1;

FIGURE 5 illustrates a third electric circuit in accordance with the system of FIGURE 1;

FIGURE 6 illustrates a further embodiment in accordance with the system of FIGURE 1;

FIGURE 7 illustrates a preferred embodiment in accordance with the system of FIGURE 1; and FIGURE 8 is a diagrammatic illustration of a physical quadrature rejection unit incorporating the circuit of FIGURE 7.

As shown on the drawings:

By way of example, the present invention may be applied to a servo system wherein an error signal comprises a sinusoidal in-phase component indicated at 10 in FIGURE 2 and an undesired quadrature component 11. In a servo system error sensing means, for example, such a quadrature component is generated when the sensing means passes through a null condition. By way of example, the quadrature rejection circuit of the present invention may be inserted between successive stages of an A.C. servo amplifier.

A servo error signal consisting of the in-phase and quadrature components of FIGURE 2 may be supplied to the input indicated at 2 of the quadrature rejection system of FIGURE 1. The system comprises a phase-sensitive demodulator 14, a filter circuit 15, a modulator circuit 16, and a wave shaping and phase adjustment network 17 coupled together as indicated at 3, 4 and 5. The demodulator 14 is supplied with a reference voltage which in the illustrated embodiment may comprise a sinusoidal signal from the same source as the supply voltage to the error sensing means of the servomechanism. This reference signal will be of the same frequency, herein termed the carrier frequency, as components 10 and 11 in FIGURE 2, and will be in phase with the component 10 of the error signal or 180° out of phase with respect to the component 10. The carrier frequency reference voltage input is indicated at 20 in FIGURE 1 and as indicated is supplied both to demodulator 14 and modulator 16. The voltage at the output 6 of network 17 will include a component in phase with the input component 10, but any quadrature component will be greatly attenuated.

A specific embodiment of the system of FIGURE 1 is illustrated in FIGURE 3 and comprises a phase sensitive demodulator 25, a direct current filter 26, a modulator 27 and a filter or tuned circuit 30 comprising a capacitor 31 of .06 microfarads and a variable inductor 32 having an inductance of 2 henries. The demodulator and modulator comprise identical half-wave detectors. Colin-Campbell L2147 transformers 35 and 36 are used with 50 volt center tapped secondaries 38 and 39. The reference voltage to primaries 40 and 41 of the transformers may be 115 volts 400 cycles per second and may be obtained from a three-phase Y connected alternator. The reference voltages and signal voltage come from the same voltage source.

A phase reversible alternating current signal is fed into the demodulator 25 at lines 43 and 44. The demodulator converts the signal to direct current which is passed through filter 26 into the modulator 27. The square wave output of the modulator is then converted into a sine wave by the tuned circuit 30. The A.C. signal input is either in-phase or 180° out of phase with the reference voltage. A voltage at phase quadrature with the reference voltage should produce no direct current output from the phase sensitive demodulator 25 and hence no alternating current output from the modulator 27.

The rejection ratio for the system may be defined as follows:

$$\text{Rejection ratio} = \frac{\text{A.C. output with A.C. input in-phase or } 180^\circ \text{ out of phase with reference}}{\text{A.C. output with A.C. input } 90^\circ \text{ out of phase with reference}}$$

The rejection ratio of the circuit of FIGURE 3 with the 30,000 ohm resistors 50 and lines 51 and 52 to filter 53 short circuited was 30:1 with a gain of in-phase voltage of .3. It is found that with an optimum resistance as indicated at 50 in series with the input, an optimum rejection ratio results, though the gain is decreased. A 400 cycle per second low pass filter as indicated at 53 in FIGURE 3 gives a better sine wave output and increases the gain. The maximum rejection ratio for the circuit of FIGURE 3 was found to be 350+ with a gain of .3. However, this circuit has a null voltage output of .004 volts. The best null output (.0008 volts) was obtained by biasing the modulator 27 with a small direct voltage, for example by injecting a small direct voltage into the modulator 27 by slightly unbalancing the demodulator 25 for example at tap 60 of resistor 61. The modulator 27 is balanced to get the best null with the small bias input voltage. While the gain was found to be the same with in-phase and out of phase inputs at lines 43 and 44, the rejection ratio was much higher with in-phase input than with a 180° out of phase input with the small D.C. bias voltage introduced into the circuit.

When the demodulator reference voltage transformer 35 was changed to one with primary windings in parallel and secondary winding in series, the input resistance 50 had to be changed from 30,000 ohms to 7400 ohms to get maximum rejection ratio. This change increased the gain. Also, the demodulator and modulator resistances were changed as shown in Table I to increase the current flow so that the diodes 65 and 66 could operate in a more linear region.

*Table I*

| | was— | reduced to— |
|---|---|---|
| $R^1$ | 2.2K | 470 ohms. |
| $R^2$ | 2.2K | 470 ohms. |
| $R^3$ | 1K Pot | 250 ohms Pot. |
| $R^4$ | 2.2K | 470 ohms. |
| $R^5$ | 2.2K | 470 ohms. |
| $R^6$ | 1K Pot. | 1K Pot. |

The rejection ratio of the modified circuit with the resistance values given in Table I was found to be better than 700 with a gain of 0.52 for the in-phase voltage component.

With 5 volts input at 400 cycles per second and the circuit constants of the modified FIGURE 3 adjusted to obtain a phase shift of 180° between the input and output, the frequency of the input and reference signals was varied from 390 to 410 cycles per second to obtain the effect of change in frequency on the performance of this embodiment. The change in phase angle of output voltage with frequency from 390 to 410 cycles per second was found to be 9°. The change in gain with frequency was found to be quite negligible.

With the tuned circuit 30 including capacitor 31 and inductor 32 removed, it was found that the gain of in-phase voltage for the modified circuit of FIGURE 3 dropped to 0.2 with a rejection ratio of 350.

The output circuit for the modulator 27 of FIGURE 3 was then changed to that shown in FIGURE 3*a*. This circuit resulted in an in-phase voltage gain of 0.68 with a rejection ratio of 500. The input frequency was varied from 390 to 410 cycles per second and the change in output voltage in phase and amplitude with change in frequency was found to be noticeable, but small enough to be negligible.

A higher rejection ratio than that obtained with the circuit of FIGURE 3 may be obtained by using a chopper modulator instead of an electronic modulator as indicated at 100 in FIGURE 4. In the circuit of FIGURE 4, the demodulator 25 may have values of $R_1$ and $R_2$ of 470 ohms and $R_3$ may be a 250 ohm potentiometer. Input resistor 50 may have a value of 7400 ohms. The filter may comprise a 4700 ohm resistor **26*a* and 2 microfarad capacitors 26*b* and 26*c* the same as in FIGURE 3. Filter 53 may comprise a 400 cycle per second low pass filter as in FIGURE 3. The output of the chopper 100 is coupled to the filter by means of a transformer as indicated at 102. This circuit proved to be the best for rejection ratio and eliminated the need of biasing the modulator as described in connection with the embodiment of FIGURE 3. The demodulator 25 in FIGURE 4 could be nulled to zero with no input. With the circuit of FIGURE 4 a rejection ratio of 1200+ was obtained with a gain of in-phase voltage of .52. Chopper coil 104 may operate on 6.3 volts. A twelve volt 400 cycle per second source is connected to lines 105 and 106 which is in-phase with the reference voltage supplied to primary 40 of transformer 35. A .1 microfarad condenser 108 and a 5000 ohm potentiometer 109 may be connected in series with the chopper coil 104** to provide a phase shifting circuit for adjusting the proper phase of the chopper while maintaining 6.3 volts on the chopper coil.

The output voltage and phase shift between output and input were determined for the circuit of FIGURE 4 with the frequency varying from 390 to 410 cycles per second. The phase shift was found not to change with amplitude, but to change considerably with frequency. The circuit has extremely high rejection ratio but uses a chopper which is less reliable than an electronic modulator and involves additional parts. The input impedance of this circuit was found to be about the same as that of FIGURE 3 which was above 20000 ohms.

FIGURE 5 illustrates a further embodiment of the system of FIGURE 1 employing a half-wave diode demodulator including diodes 120 and 121 connected with the secondary 130 of a single reference voltage transformer 131 whose primary 132 is connected with a reference voltage of 115 volt 400 cycles per second, for example, as in the preceding embodiments. The direct current output of the demodulator including diodes 120 and 121 is developed across a 33,000 ohm resistor 140 which is shunted by a 2 microfarad capacitor 141 and fed into the modulator including diodes 125 and 126, filter 53 and tuned circuit 30 including .06 microfarad capacitor 31 and 2 henry inductor 32. The in-phase voltage gain of the circuit is .7 with a rejection ratio of 7:1. By reversing the direction of the diodes 120 and 121 in the demodulator the rejection ratio was increased to 16 with an in-phase voltage gain of 0.56.

With the circuit of FIGURE 6 having demodulator diodes 150 and 151 connected oppositely to the diodes 120 and 121 shown in FIGURE 5 with respect to the modulator diodes 154 and 155, optimum results are obtained using resistance values of 470 ohms for resistors 161, 162, 164, 165 and 166, 1500 ohms for resistor 163 and 250 ohms and 1000 ohms for potentiometers 167 and 168, and utilizing a three microfarad capacitor 170 and a 12 henry inductor 171. A gain of in-phase voltage of .6 with a rejection ratio of 100+ was obtained.

A preferred embodiment of the system of FIGURE 1 is illustrated in FIGURE 7. The circuit of FIGURE 7 gives extremely high rejection ratio, high gain, and does not used any moving parts. The circuit comprises a demodulator 200 and modulator 201 energized from a transformer 204 by means of secondaries 205 and 206. The primary 208 of the transformer is connected to 115 volts 400 cycles per second reference voltage, for example. The input is introduced at lines 210 and 211 through a 1000 ohm potentiometer 212 and an input resistor of 4700 ohms and designated by the reference numeral 215.

It is found that with input voltages up to 5 volts, the rejection ratio is above 1000 and with input voltages up to 15 volts the rejection ratio is above about 800 volts. The gain of the in-phase voltage component is .75 at no load, .65 at 100,000 ohm load, and .55 at 50,000 ohm load. The input impedance may be 20,000 ohms. The phase shift between the input and output at 400 cycles per second is found to be 0 plus or minus 3° or 180 plus or minus 3°. Phase shift over 400 plus or minus 10 cycles per second is less than plus or minus 5°.

Any of the circuits may be housed in a physically compact housing indicated at 250 in FIGURE 8 with input terminals 251 and 252 and output terminals 253 and 254. For example, the circuit of FIGURE 7 may be packaged in a housing 2⅛ inches by 4½ inches by 3 inches.

It will be apparent that many further modifications and variations may be effected without departing from the scope of the novel concepts of the present invention.

We claim as our invention:

A quadrature rejection system comprising a phase sensitive demodulator having a reference input for connection to a carrier frequency reference voltage, having a signal input for connection to a carrier frequency input signal having a desired component and an undesired quadrature component, and having an output for delivering a direct current output signal; and a chopper modulator having a carrier input for connection to a carrier frequency reference voltage, and having a signal input connected to the output of said demodulator for producing a carrier frequency output signal having a greatly attenuated quadrature component said output signal being in phase with said desired component of said carrier frequency input signal.

References Cited in the file of this patent

UNITED STATES PATENTS

| | | |
|---|---|---|
| 2,362,898 | Gilman | Nov. 14, 1944 |
| 2,582,271 | Page | Jan. 15, 1952 |
| 2,774,932 | Patton | Dec. 18, 1956 |
| 2,795,653 | McCoy | June 11, 1957 |
| 2,870,346 | Essler | Jan. 20, 1959 |
| 2,873,364 | Huddleston et al. | Feb. 10, 1959 |
| 2,962,661 | Semel | Nov. 29, 1960 |